(12) United States Patent
Ki

(10) Patent No.: US 7,478,688 B2
(45) Date of Patent: Jan. 20, 2009

(54) ANTI-DIVE/SQUAT SUSPENSION SYSTEM

(75) Inventor: Nohoon Ki, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 528 days.

(21) Appl. No.: 11/273,462

(22) Filed: Nov. 14, 2005

(65) Prior Publication Data

US 2007/0107950 A1    May 17, 2007

(51) Int. Cl.
*B62D 55/00* (2006.01)
*B62D 55/104* (2006.01)

(52) U.S. Cl. ......................... 180/9.1; 305/120
(58) Field of Classification Search ............... 180/9.1, 180/9.21, 9.48, 9.5, 9.52, 9.54, 9.58; 305/120, 305/131, 132, 135
See application file for complete search history.

(56) References Cited

U.S. PATENT DOCUMENTS

| | | | | |
|---|---|---|---|---|
| 5,273,126 A | * | 12/1993 | Reed et al. ............... | 180/9.21 |
| 5,340,205 A | * | 8/1994 | Nagorcka ................ | 305/132 |
| 6,199,646 B1 | * | 3/2001 | Tani et al. ............... | 180/9.21 |
| 6,283,562 B1 | * | 9/2001 | Tsubota et al. ........... | 305/135 |
| 6,318,484 B2 | * | 11/2001 | Lykken et al. ............ | 180/9.48 |
| 6,401,847 B1 | * | 6/2002 | Lykken ................... | 180/9.1 |
| 6,547,345 B2 | * | 4/2003 | Phely .................... | 305/124 |
| 6,601,664 B2 | * | 8/2003 | Hiraki et al. ............. | 180/9.5 |
| 6,655,482 B2 | * | 12/2003 | Simmons ................ | 180/9.1 |

* cited by examiner

*Primary Examiner*—Paul N Dickson
*Assistant Examiner*—Marc A Scharich

(57) ABSTRACT

A suspension system is provided for a vehicle track assembly having a lower front idler wheel, a lower rear idler wheel, an upper drive wheel, a support link, a plurality of lower support wheels arranged between the idler wheels and mounted on the support link, and an endless belt mounted around the wheels. The front and rear idler wheels are separated by a length L. An upper belt plane is tangent to one of the idler wheels and the drive wheel and a lower belt plane is tangent to the front idler wheel and the rear idler wheel. The vehicle center of gravity is located a distance H above the lower belt plane. A suspension member pivots about a fixed pivot axis. The components of suspension system are sized and arranged to prevent the vehicle from diving or squatting.

6 Claims, 4 Drawing Sheets

ANTI-DIVE/SQUAT SUSPENSION SYSTEM

BACKGROUND

The present invention relates to a suspension system for a tracked vehicle.

Tracked vehicles typically have unsuspended track assemblies. But, tracked vehicles with suspended track assemblies have been proposed. However, a tracked vehicle with a suspended track assembly may "dive" when being braked, and/or may "squat" when being accelerated.

SUMMARY

Accordingly, an object of this invention is to provide a suspension system for a tracked vehicle track assembly which prevents the vehicle from diving or squatting.

These and other objects are achieved by the present invention, wherein a suspension system is provided for a vehicle track assembly having a lower front and rear idler wheels separated by a length L, an upper drive wheel, a support link, a plurality of lower support wheels arranged between the idler wheels and mounted on the support link, and an endless belt mounted around the wheels. An upper front belt plane is tangent the front idler wheel and the drive wheel. An upper rear belt plane is tangent the rear idler wheel and the drive wheel. A lower belt plane is tangent to the front and rear idler wheels. The vehicle has a center of gravity located a distance H above the lower belt plane. The suspension system includes a suspension member pivotal about a fixed pivot axis. The suspension member has a first end coupled to the support link by a resilient member. The suspension member also has a second end pivotally coupled to an axle pin defining a rotation axis of the idler wheel, and pivotally coupled to an end of the support link. The rotation axis and the pivot axis define a suspension axis. The suspension axis and the upper belt plane defining a first angle $\theta$. The suspension axis and the lower belt plane defining a second angle $\phi$, such that $(\sin \phi - \sin \theta) \div (H/L \times \cos \phi) = 1$.

DETAILED DESCRIPTION

Figure 1:
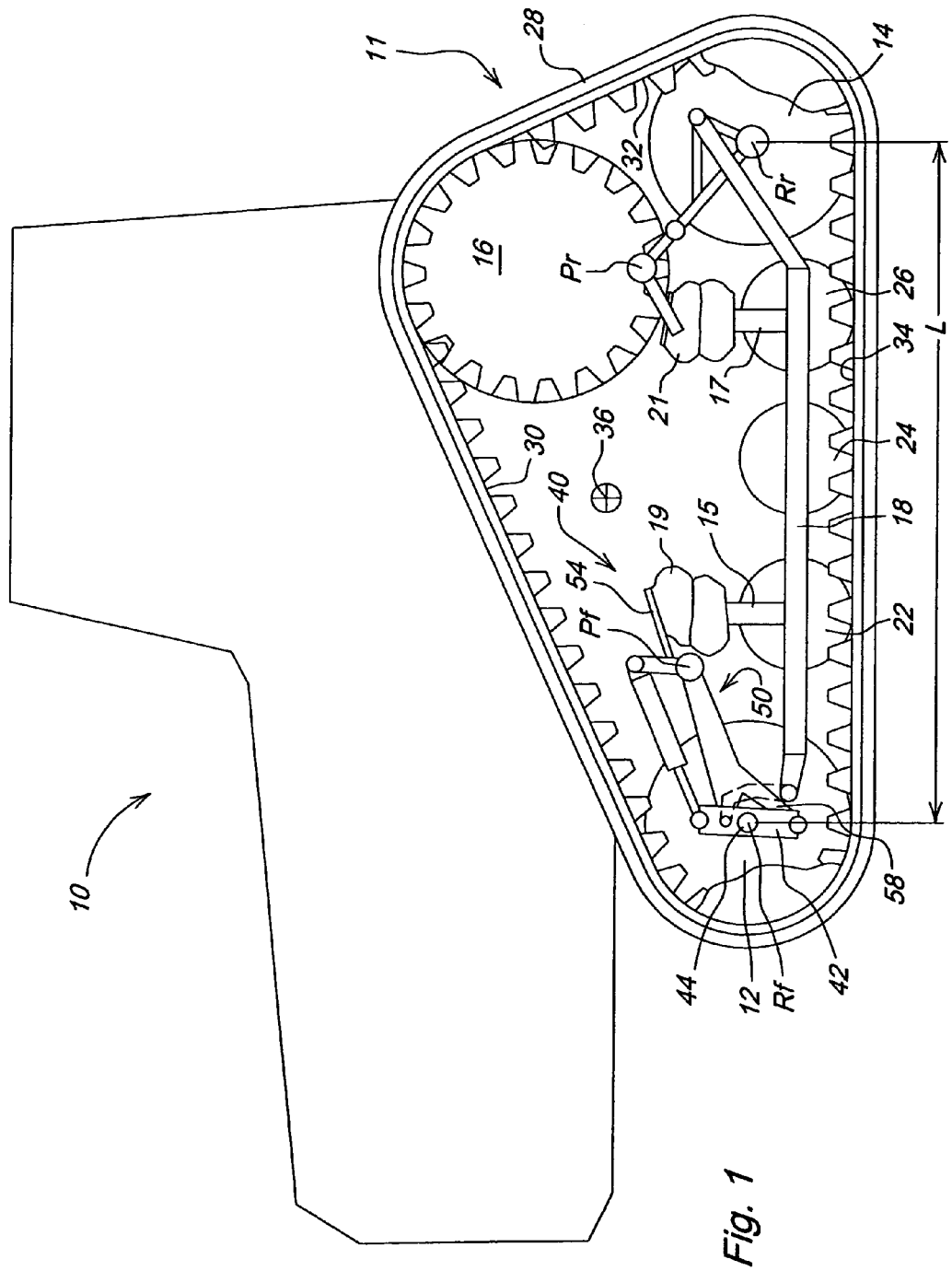
FIG. 1 is a simplified schematic view of a tracked vehicle including the present invention.
Figure 2:
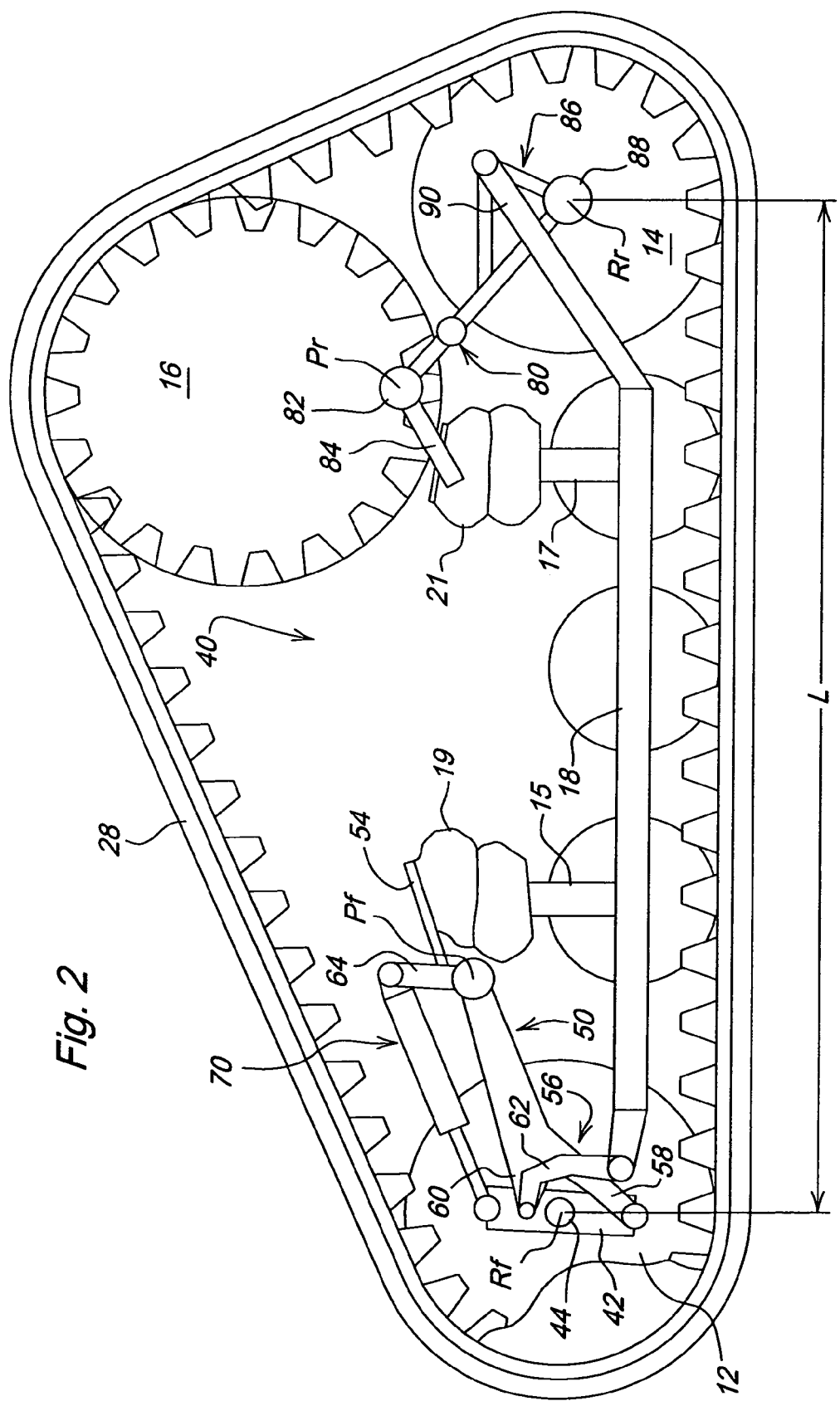
FIG. 2 is a view of the track assembly and suspension system of FIG. 1 with parts removed for clarity.

Referring to FIGS. 1-4, a track laying vehicle 10 has a frame (not shown), a track assembly 11 which includes a lower front idler wheel 12, a lower rear idler wheel 14, an upper rear drive wheel 16, a support link 18, a plurality of lower support wheels 22, 24 and 26 arranged between the idler wheels 12 and 14 and mounted on the support link 18, and an endless belt 28 mounted around the wheels 12-16. The support link 18 includes a front and rear support posts 15 and 17, which support respective resilient members or air bags 19 and 21. The support link 18 is movable with respect to the vehicle frame (not shown).

The front and rear idler wheels 12 and 14 are separated by a length L. The track assembly 11 defines an upper front belt plane 30 which is tangent to the front idler wheel 12 and the drive wheel 16. The track assembly 11 defines an upper rear belt plane 32 which is tangent to the rear idler wheel 14 and the drive wheel 16. The track assembly 11 also defines a lower belt plane 34 which is tangent to the lower surfaces of the front idler wheel 12 and the rear idler wheel 14. The vehicle 10 has a center of gravity 36 located a distance H above the lower belt plane 34.

The vehicle also includes a suspension system 40 for the track assembly 11. The suspension system 40 includes a front idler link 42 coupled to a front axle pin 44 which defines the rotation axis Rf of the front idler wheel 12. A front suspension member 50 is pivotal about a front pivot axis Pf which is fixed with respect to the frame (not shown) of the vehicle 10. The suspension member 50 has a first or rear end 54 which is coupled to the support link 18 by a front air bag 19. The suspension member 50 has a forked front or second end 56 with a lower arm or end 58 pivotally coupled to a lower end of the front idler link 42, and an upper arm 60 pivotally coupled to an upper or first end of a connecting link 62. The connecting link 62 has a lower or second end pivotally coupled to a front end of the support link 18. An arm 64 projects rigidly upward from suspension member 50 near pivot point Pf. A variable length tensioning member 70 is coupled between the arm 64 of suspension member 50 and an upper end of the front idler link 42.

Figure 3:
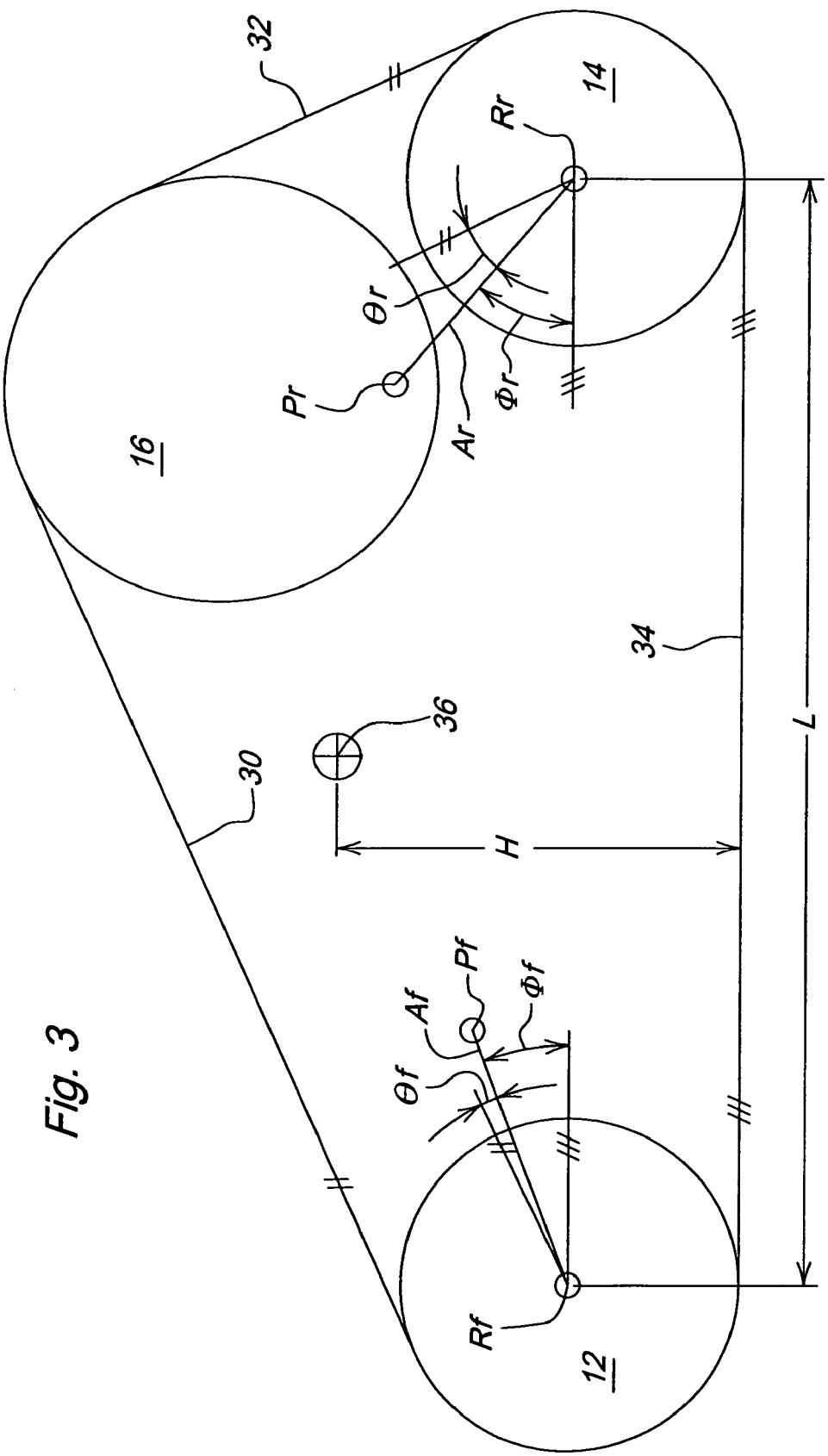
FIG. 3 is a diagram illustrating angular features of the track assembly and suspension system of FIG. 1.

As best seen in FIG. 3, the rotation axis Rf of front idler wheel 12 and the pivot axis Pf define a suspension axis Af extending therebetween. The suspension axis Af and the upper belt plane define a first angle $\theta f$, and the suspension axis Af and the lower belt plane define a second angle $\phi r$. Preferably, the various components described above are sized and positioned so that $(\sin \phi f - \sin \theta f) \div (H/L \times \cos \phi f) = 1$. If this relationship is satisfied, the vehicle 10 will not "dive" as it is braked while it is moving forward. In other words, as the vehicle is braked, the front end will not dip downwardly.

The suspension system 40 also includes a rear suspension member 80. Rear suspension member 80 is pivotal about a rear pivot axis Pr which is fixed with respect to the frame (not shown) of the vehicle 10. The rear suspension member 80 has a first end 84 coupled to the post 17 of support link 18 by resilient member or air bag 21. The suspension member 80 has a second end 86 which is pivotally coupled to a rear axle pin 88 which defines the rotation axis Rr of the rear idler wheel 14, and which is pivotally coupled to a rear end 90 of the support link 18.

The rotation axis Rr and the pivot axis Pr define a suspension axis Ar extending therebetween. The suspension axis Ar and the rear belt plane define a first angle $\phi b$, the suspension axis Ar and the lower belt plane defining a second angle $\phi r$. Preferably, the various components described above are sized and positioned so that $(\sin \phi r - \sin \theta r) \div (H/L \times \cos \phi r) = 1$. If this relationship is satisfied, the vehicle 10 will not "squat" as it is being accelerated in the forward direction.

Figure 4:
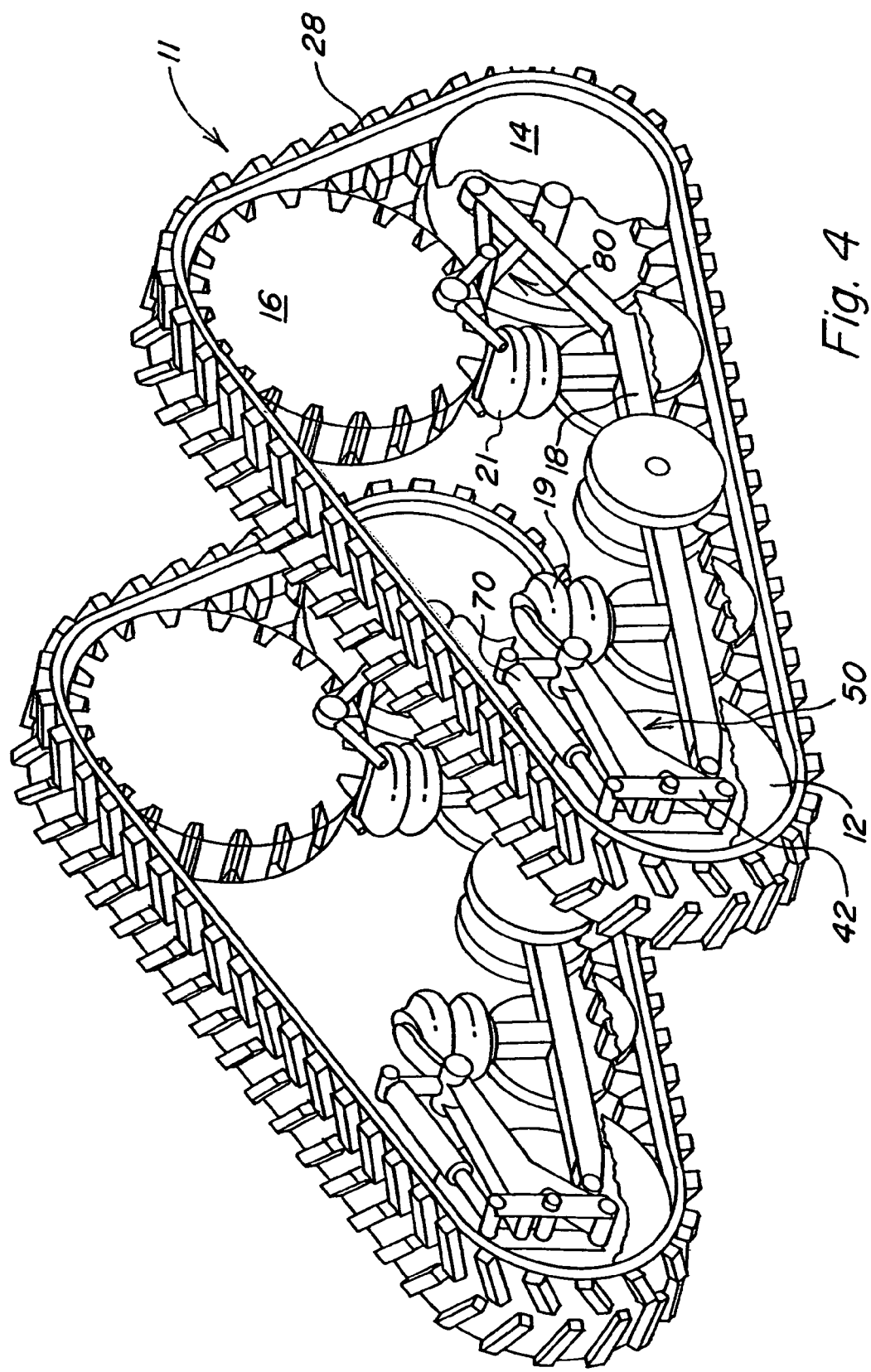
FIG. 4 is a simplified perspective view of the track assembly and suspension system of FIG. 1.

As best seen in FIG. 4, the front idler link 42 and the suspension member 50 are formed with identical inner and outer structural members. Most of the connecting link 62 (which is obscured in FIG. 4) is located between these inner and outer structural members. Similarly, portions of the suspension member 80 are also formed with identical inner and outer structural members.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A suspension system for a track assembly of a track laying vehicle, the track assembly having a lower front idler wheel, a lower rear idler wheel, an upper drive wheel, a support link, a plurality of lower support wheels arranged between the idler wheels and mounted on the support link, and an endless belt mounted around the wheels, the front and rear idler wheels being separated by a length L, the track assembly defining an upper belt plane which is tangent to one of the idler wheels and the drive wheel and defining a lower belt plane which is tangent to the front idler wheel and the rear idler wheel, and the vehicle having a center of gravity located a distance H above the lower belt plane, the suspension system comprising:

a suspension member pivotal about a pivot axis which is fixed with respect to a frame of the vehicle, the suspension member having a first end coupled to the support link by a resilient member, the suspension member having a second end pivotally coupled to an axle pin defining a rotation axis of one of said idler wheels, and pivotally coupled to an end of the support link, and the rotation axis and the pivot axis defining a suspension axis extending therebetween, the suspension axis and the upper belt plane defining a first angle $\theta$, the suspension axis and the lower belt plane defining a second angle $\phi$, such that $(\sin \phi - \sin \theta) \div (H/L \times \cos \phi) = 1$.

2. The suspension system of claim 1, wherein:
said one idler wheel is the front idler wheel;
the axle pin is a front axle pin defining a rotation axis of the front idler wheel;
a front idler link is coupled to the front axle pin;
the second end of the suspension member is pivotally coupled to a lower end of the front idler link; and
a connecting link has a first end pivotally coupled to the second end of the suspension member and has a second end pivotally coupled to a front end of the support link.

3. The suspension system of claim 2, further comprising:
a variable length tensioning member coupled between the suspension member and an upper end of the front idler link.

4. The suspension system of claim 1, wherein:
said one idler wheel is the rear idler wheel;
the axle pin is a rear axle pin defining a rotation axis of the rear idler wheel.

5. A suspension system for a track assembly of a track laying vehicle, the track assembly having a lower front idler wheel, a lower rear idler wheel, an upper drive wheel, a support link, a plurality of lower support wheels arranged between the idler wheels and mounted on the support link, and an endless belt mounted around the wheels, the front and rear idler wheels being separated by a length L, the track assembly defining an upper belt plane which is tangent to the front idler wheel and the drive wheel and defining a lower belt plane which is tangent to the front idler wheel and the rear idler wheel, and the vehicle having a center of gravity located a distance H above the lower belt plane, the suspension system comprising:

a front idler link coupled to a front axle pin defining a rotation axis of the front idler wheel;

a suspension member pivotal about a pivot axis which is fixed with respect to a frame of the vehicle, the suspension member having a first end coupled to the support link by a resilient member, the suspension member having a second end pivotally coupled to a lower end of the front idler link;

a connecting link having a first end pivotally coupled to the second end of the suspension member and having a second end pivotally coupled to a front end of the support link; and a variable length tensioning member coupled between the suspension member and an upper end of the front idler link, the rotation axis and the pivot axis defining a suspension axis extending therebetween, the suspension axis and the upper belt plane defining a first angle $\phi f$, the suspension axis and the lower belt plane defining a second angle $\phi f$, such that $(\sin \phi f - \sin \theta f) \div (H/L \times \cos \phi f) = 1$.

6. A suspension system for a track assembly of a track laying vehicle, the track assembly having a lower front idler wheel, a lower rear idler wheel, an upper drive wheel, a support link, a plurality of lower support wheels arranged between the idler wheels and mounted on the support link, and an endless belt mounted around the wheels, the front and rear idler wheels being separated by a length L, the track assembly defining an upper belt plane which is tangent to the rear idler wheel and the drive wheel and defining a lower belt plane which is tangent to the front idler wheel and the rear idler wheel, and the vehicle having a center of gravity located a distance H above the lower belt plane, the suspension system comprising:

a suspension member pivotal about a pivot axis which is fixed with respect to a frame of the vehicle, the suspension member having a first end coupled to the support link by a resilient member, the suspension member having a second end pivotally coupled to a rear axle pin defining a rotation axis of the rear idler wheel, and pivotally coupled to a rear end of the support link, and the rotation axis and the pivot axis defining a suspension axis extending therebetween, the suspension axis and the upper belt plane defining a first angle $\theta r$, the suspension axis and the lower belt plane defining a second angle $\phi r$, such that $(\sin \phi r - \sin \theta r) \div (H/L \times \cos \phi r) = 1$.

* * * * *